C. H. BROWN.
DEVICE FOR RAISING SUNKEN VESSELS.
APPLICATION FILED JULY 25, 1910.
1,005,408.
Patented Oct. 10, 1911.
4 SHEETS—SHEET 1.
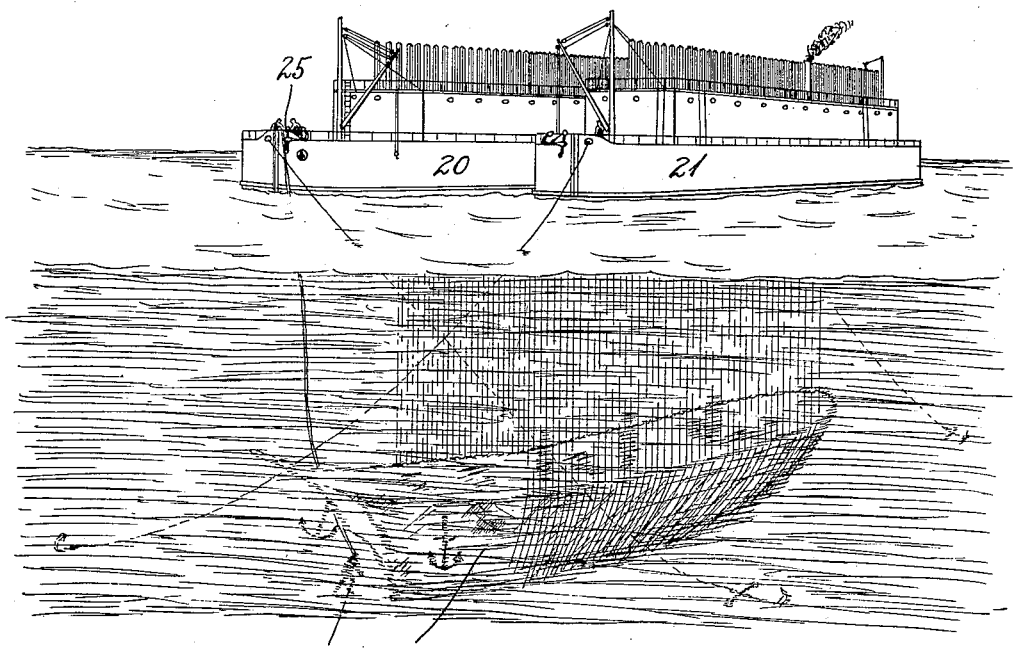
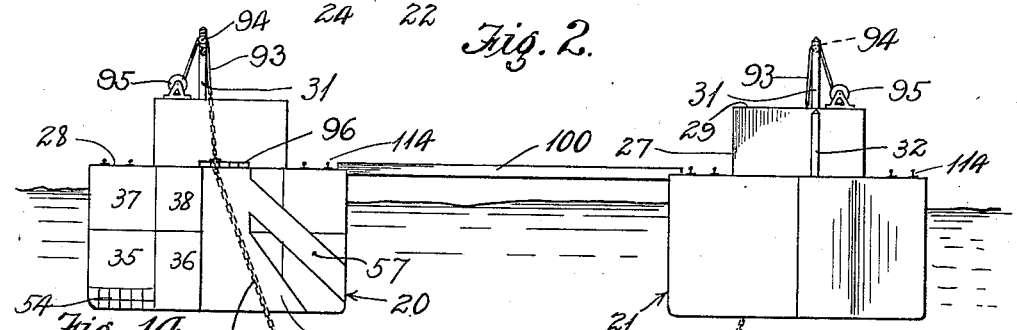
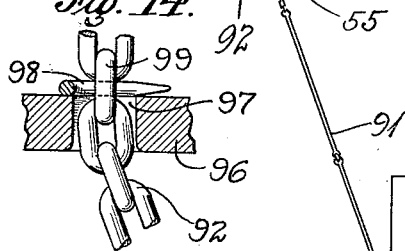
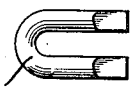
Witnesses.
Inventor:
Charles H. Brown.
by
Attys.

C. H. BROWN.
DEVICE FOR RAISING SUNKEN VESSELS.
APPLICATION FILED JULY 25, 1910.
1,005,408.
Patented Oct. 10, 1911.
4 SHEETS—SHEET 2.
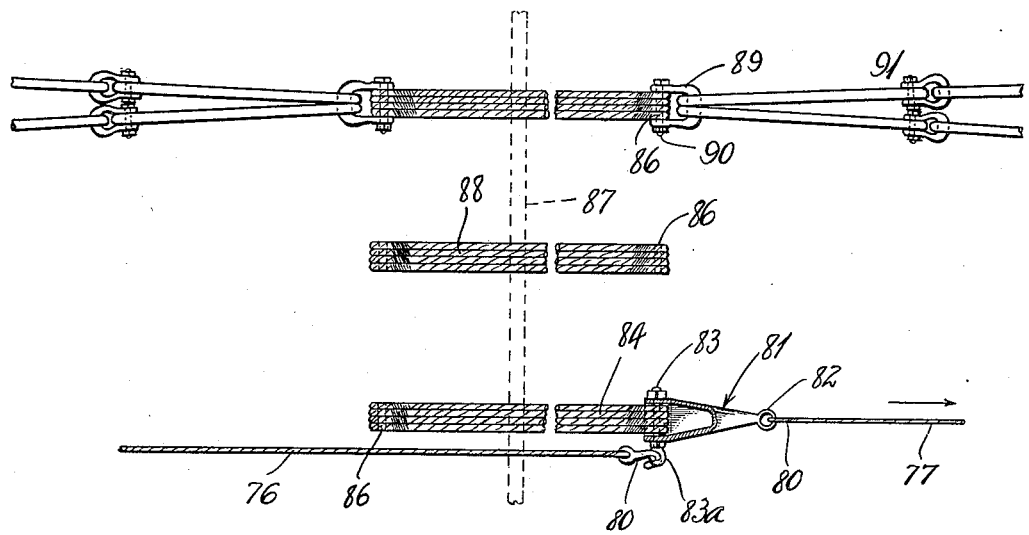
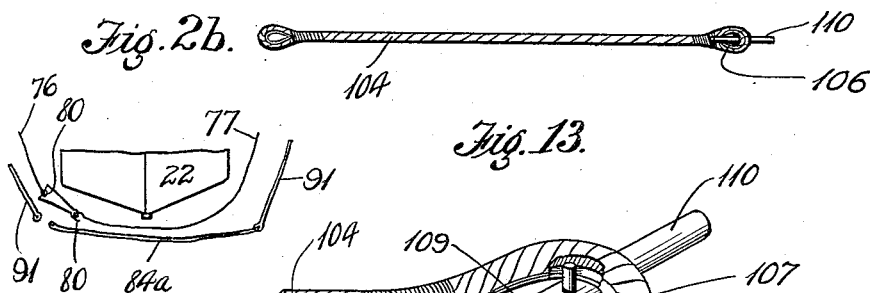
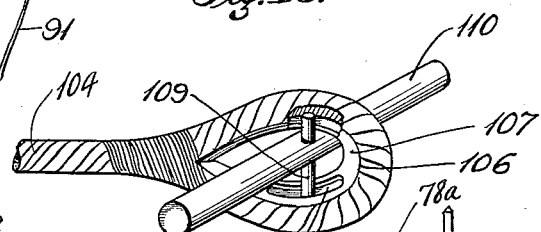
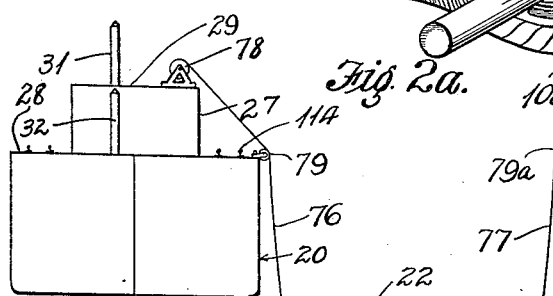
Witnesses.
E. P. Pollard
F. D. Ammen
Inventor.
Charles H. Brown.
by
Howard Strauss
Attys.

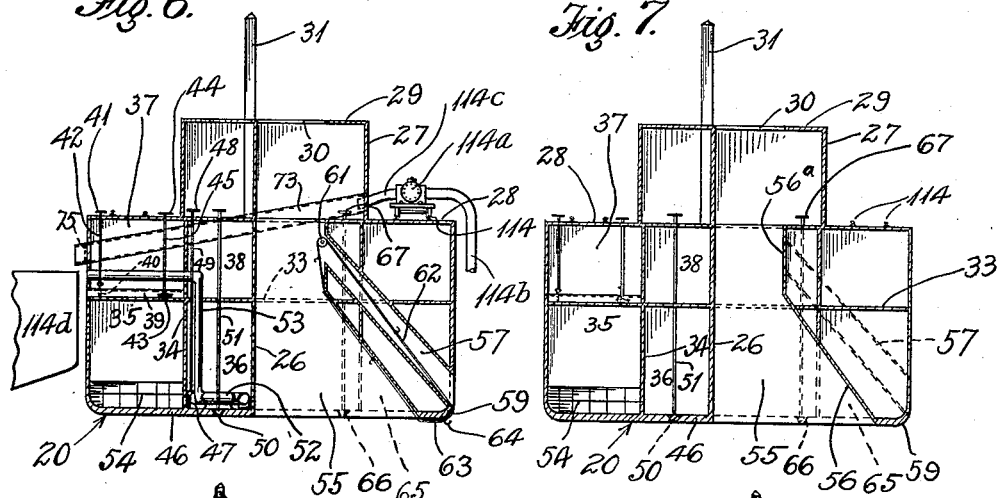

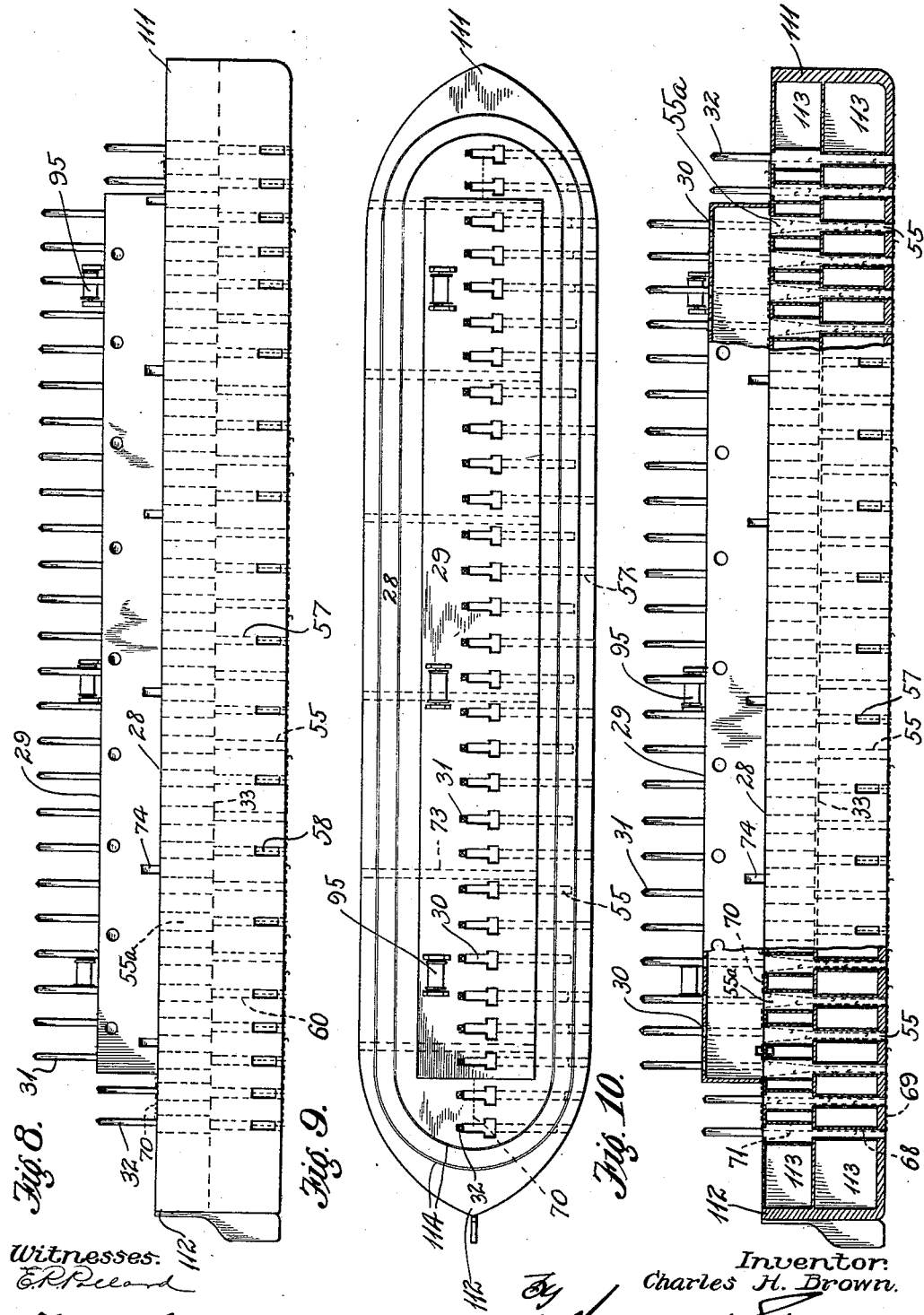

UNITED STATES PATENT OFFICE.

CHARLES H. BROWN, OF LONGBEACH, CALIFORNIA.

DEVICE FOR RAISING SUNKEN VESSELS.

1,005,408.  Specification of Letters Patent.  Patented Oct. 10, 1911.

Application filed July 25, 1910. Serial No. 573,631.

*To all whom it may concern:*

Be it known that I, CHARLES H. BROWN, a citizen of the United States, residing at Longbeach, county of Los Angeles, State of California, have invented certain new and useful Inventions in Devices for Raising Sunken Vessels, of which the following is a specification.

This invention relates to apparatus for raising sunken vessels.

The invention contemplates the employment of two barges which are brought into position about over the sunken ship and from which cables extend downwardly so as to form slings passing under the ship's keel.

The object of the invention is to provide an improved construction for the barges which will facilitate the manipulation and readjustment of the supporting cables or slings as the ship is raised to the water level.

The invention comprises means for facilitating the passing of the slings along the outer sides of the barges and relates also to means for placing the slings in position under the ship's keel.

Further objects of the invention will appear more fully hereinafter.

In the drawings forming a part of the annexed specification, Figure 1 is a perspective showing the manner in which the barges are brought in position over the sunken vessel. Fig. 2ª is a diagrammatical view showing the hull of the sunken ship and showing the two barges in position above it in end elevation, and indicating the manner in which the slings are run under the sunken ship. Fig. 2ᵇ is a view similar to Fig. 2ª but showing the operation of setting the slings at a different stage. Fig. 2 is a view similar to Fig. 2ª showing the slings in place under the hull of the sunken ship. This view also indicates the first position of the sling cables with respect to the manner in which they pass up through the barges. Fig. 3 is a view similar to Fig. 2 but showing the hull of the sunken ship raised to the surface and indicating a second position for the slings and cables with respect to the manner in which they pass through the barges. Fig. 4 is a similar view to Fig. 3 but showing the sunken ship supported by cables passing through the dead lights or port holes, said cables being secured to chocks or cleats on the decks of the barges. Fig. 5 is a diagrammatical view illustrating the manner in which one of the barges may be employed to overturn the hull of the sunken ship. Fig. 6 is a vertical cross section taken through one of the barges and indicating the manner of constructing the same, together with means for shifting the cables from their first position to their second position as referred to above. Fig. 7 is a view similar to Fig. 6 but showing the cross section taken at another point. Fig. 8 is a side elevation of one of the barges and indicating its general construction. Fig. 9 is a plan of the barge shown in Fig. 8. Fig. 10 is a side elevation and partial section of the barge shown in Figs. 8 and 9 and further illustrating details of its construction together with means for shifting the lifting cables longitudinally along the barge. Fig. 11 is a plan in which the keel of the sunken ship is indicated in dotted lines and showing the manner in which the cables are passed under the hull. Fig. 12 is a detail view showing a short length of cable having a special construction enabling it to be secured at one end in a dead light or port hole. Fig. 13 is a perspective of one end of the cable which is shown in Fig. 12, certain parts being shown in cross section. This view is a detail of the anchoring end of the cable shown in Fig. 12. Fig. 14 is a vertical section taken through the main deck of one of the barges and illustrating means for supporting the chain cables which support the slings. Fig. 15 is a plan showing the key or staple which is indicated in Fig. 14 and which coöperates with the chain cables to support them as illustrated in Fig. 14.

Referring more particularly to the parts and especially to Fig. 1, 20 and 21 represent the barges which are brought into position over the sunken ship 22, the barges being anchored end for end with the sunken ship so that lifting lines or cables can be passed down under the hull of the sunken ship, being set in position under the hull by a diver 24, supplied with air by diving apparatus at the point 25 on the deck of one of the barges.

Referring now particularly to Figs. 6 and 7 which show the construction of the left hand barge 20; in this connection it should be understood that the barges are identical in construction except that they are left and right respectively.

In the following description the side of the barges disposed toward the sunken ship will be referred to as the inboard side of the barge, while the outer side remote from the sunken ship will be referred to as the outboard side.

Each of the barges is provided with a longitudinal bulk head 26 which extends throughout the length of its hull and this bulk head is disposed slightly toward the outboard side of the hull with respect to the central line or axis of the barge. This bulkhead passes up through the deck house 27 which is disposed on the main deck 28, said deck house supporting a cover or upper deck 29 with openings 30 through which cables may pass upwardly to connect to blocks which may be attached to the upper ends of stanchions or masts 31 which are placed at intervals along the barges. Beyond the ends of the deck house similar masts 32 are provided, the upper ends of which are disposed near the roof or upper deck 29 of the barge. All of these masts are stepped on the main deck as indicated in Figs. 6 and 7.

Each barge is formed with a lower deck 33 and on the left side of the central bulk head 26 an intermediate longitudinal bulk-head 34 is provided which runs throughout the length of the barge; and this bulk-head divides the outboard side of each barge into bilge compartments 35 and central water compartments or keel compartments 36 which are disposed adjacent to the central bulk-head 26. This intermediate bulk-head 34 passes also between the lower deck 33 and the main deck 28 so as to divide the space between the main and lower decks into a main upper water compartment 37 and auxiliary upper water compartments 38, the latter being disposed adjacent to the central bulk-head 26.

In the lower part of the compartments 37 drain pipes 39 extend through the outboard side of the barge, and the inner ends of these drain pipes connect with the compartments 38 so as to drain them when desired. The flow through these pipes is controlled by gate valves 40 operated by handwheels 41 on the main deck attached to valve stems 42 as shown.

Sluice valves 43 are provided in the deck 33 between the compartments 35 and 37 so as to enable water to flow from the lower compartments to the upper, and these valves 43 are controlled by hand wheels 44 attached to valve stems 45 as indicated.

Near the bottom 46 of the barge sluice valves 47 are provided in the intermediate bulk-head 34 which open connection between the compartments 35 and 36 so that the compartments 35 may be flooded from the compartments 36. These valves 47 are controlled by handwheels 48 on the main deck attached to valve stems 51 as indicated.

Valves 50 are provided in compartment 36 for flooding the same.

In the compartments 36 centrifugal pumps 52 are provided, the delivery pipes 53 of which pass upwardly and through the side of the barge on the outboard side. In the bilge compartments 35 a permanent ballast 54 of iron or similar material is placed and most of this ballast can be changed from time to time when desired, access being had into the interior of the bilge compartments by water tight doors in the bulk-heads (not illustrated).

As shown most clearly in Fig. 7 the inboard side of each barge is formed with a plurality of wells 55 which pass up from the bottom through both decks and directly under the openings 30 in the upper deck 29. The upper portions of these walls are of uniform width the inbent sides of the walls being formed by inclined side plates 56. The upper edges of these inclined side plates 56 abut against the lower edges of the vertical side plates 56$^a$ which form the outbent sides of the upper parts of these wells as indicated in Fig. 7. As indicated in Fig. 8 these wells are arranged at intervals throughout the entire length of the barge, being arranged opposite to the stanchions or masts 31 and 32. Throughout the middle portion of the body of the barge a plurality of inclined trunks or cable ways 57 are formed, the upper ends of which pass through the vertical side plates 57 and the lower ends of which form openings 58 near the inbent bilge 59. Throughout the principal portion of the length of the barge these inclined trunks 57 are arranged in connection with alternate individuals of the wells 55 but near the bow and stern of each barge I have illustrated similar trunks 60 arranged in connection with the forward and aft wells.

As indicated most clearly in Fig. 6 near the upper end of the trunks 57 and 60 I provide pulleys 61 and over these pulleys endless chains or cords 62 pass. The lower run of these cords pass down through the wells 55 and the upper runs pass upwardly through the trunks 57 so that the lower ends of these endless cords form loops 63 around the bilge 59 as indicated. These endless cords are provided with hooks 64 so that they may operate as carriers for passing cables upwardly through the trunks in a manner which will be described more fully hereinafter.

On the inboard sides between the bottom 46 and the lower deck 33 inboard bilge compartments 65 are formed which are adapted to be flooded by opening sluice valve 66 controlled by hand wheels 67 on the main deck as indicated in Fig. 6.

As indicated in Fig. 10 the adjacent wells 55 are connected by carriers 68 formed of endless cords which form loops 69 at their lower ends running longitudinally of the bottom and having loops 70 at their upper ends passing longitudinally of the main deck 28. These carriers 68 are similar to the carriers 62 already described and are provided with hooks 71 which have the same function as the hooks 64. They may be operated from the main deck within the deck house and it is intended that the riggers or wreck hands shall seize the cords with their hands so as to pull the cords in the proper direction. These carriers enable the lifting cables to be pulled up through the wells or passed around from one well to the next. In this connection it should be understood that the hooks 71 project in the same direction for the reason that the operation of laying the cables under the sunken ship is commenced at one end and proceeded with toward the other end.

Through the inboard sides of the deck house 27 inclined drain chutes 73 pass having exposed receiving mouths 74 on the inboard side of the deck house, and depressed delivery ends or mouths 75 on the hull of the barge at the outboard side.

Referring to Fig. 2$^a$ the manner of placing the slings under the hull of a sunken ship will now be described: For this purpose I provide a drop line or cord 76 from the barge 20, the upper end of said drop line passing over a windlass 78 on the upper deck of the barge and passing over a guide pulley 79 on the gunwale of the barge. From the barge 21 a similar drop line or cord 77 is run, the upper end passing around a windlass 78$^a$ and passing down over a guide pulley 79$^a$ as indicated. The ends of these drop lines are provided with hooks 80. In connection with these drop lines I employ a shoe 81 which is of hollow conical form as indicated in Fig. 11. The small end of this shoe has an eye 82 and the large end of the shoe which is open is provided with a transverse pin 83 having an eye 83$^a$ formed at one end thereof. In Fig. 2$^a$ I illustrate the manner in which this shoe is employed for setting a keel-cable or keel-spanner 84$^a$ under the keel 87. In doing this it should be understood that the cables can be set in place from either side.

In Fig. 2$^a$ I illustrate the keel cable as being set in place from the right side. In order to do this the drop line or cord 76 is passed under the hull 22 and is attached to the eye 82 in the small end of the cone 81; and the hook 80 of the other cord 77 is attached in the eye 83$^a$ of the bolt 83 and this bolt 83 attaches the keel cable 84$^a$ in the manner illustrated in Fig. 2$^a$. To the opposite end of the keel cable 84$^a$ one of the lifting cables 91 is attached. The line 77 is then paid out and the line 76 is taken up so as to draw the shoe 81 under the keel and to the left side of the hull 22. The line 76 is then detached from the shoe and the bolt 83 is removed so as to free the left end of the keel cable 84$^a$. The diver then connects the free end of the cable 84$^a$ with the lifting cable 91 which hangs down from the left barge 20. The shoe must then be returned to the right side so as to bring down the next cable. The lifting cable 91 which has just been connected may be shifted along under the hull from above by means of the shifting carriers described above. In order to carry the shoe back to the right side it should be disconnected from the drop lines 76 and 77 and reattached thereto in a reverse position as indicated in Fig. 2$^b$. The line 77 is then taken up and the line 76 paid out so that the shoe passes back to the right hand barge so as to have another cable attached thereto.

In Fig. 2$^b$ the anchor cable 84$^a$ is illustrated about to have its free end connected with the left hand lifting cable.

In Fig. 11 the manner of securing the shoe to the drop lines and the manner of securing the end of a keel cable in the shoe is illustrated but this view shows the shoe as though it were being used to bring the keel cable into position from the left side instead of from the right. As indicated in Fig. 11 the keel cable 84 is formed of several cables, the ends of which are formed into alining eyes 86 to enable shackle bolts 90 to be passed through to secure shackles 89; in these shackles the ends of the lifting cables 91 are secured as shown. In this figure 88 represents one of the keel cables lying under the keel but having no lifting cables attached thereto.

The lifting cables 91, attached to the ends of the keel spanners 88 form slings under the hull of the sunken ship as shown in Fig. 2 and to the ends of these slings, chain cables 92 are attached which pass up through the wells 55 and attached to flexible ropes or cables 93, and these cables 93 pass through blocks or sheaves 94 secured to the masts 31, and pass down to the drums of windlasses 95 on the main deck of the barges. As indicated in Figs. 2 and 14 where these chain cables 92 pass through the main deck, bridge plates 96 are placed across the openings 97 through which the cables pass upwardly. At these openings 97 U shaped keys or staples 98 are provided which are adapted to be passed through a link such as the link 99 and rest upon the upper side of the plate so as to support the chain independently of the windlasses 95. These windlasses 95 do not raise the ship but simply take up the slack of the cables and slings. In the operation of raising a sunken ship the water compartments of the barges are flooded so as to sink them to a low level in the water and all of the slack of the slings is taken up by the windlasses, and the chains 92 are then locked by the keys 98 as suggested above.

In taking up the slack of the slings the barges are held apart by shores 100 laid between the inboard sides thereof as shown in Fig. 2. The water compartments are then pumped out by the centrifugals 52 and in this way the barges are lightened and rise by reason of buoyancy. In this way as the barges rise they raise the sunken ship from the bottom and the barges carrying the sunken ship are then towed to shallow water until the sunken ship strikes bottom again. This operation is repeated until the upper portion of the hull of the sunken ship comes well up between the barges. The cables 91 and 92 are then transferred from the wells 55 by means of the carriers 62 into the trunks 57 as indicated in Fig. 3 and the hull of the sunken ship is then held jammed between the sides of the barges, the shores 100 having been removed. With the sunken ship held in this position it is possible to bring it into dry-dock. If desired, however, instead of supporting the sunken ship in the manner shown in Fig. 3 the hull may be supported as indicated in Fig. 4 by means of cables 101 which pass through the dead lights in the shell of the hull, the ends of the cables 101 being attached to cleats 102 on the main decks of the barges on their inboard sides as will be readily understood.

In Fig. 5 I illustrate the manner in which one of the barges can be employed to overturn a sunken ship 103. In order to accomplish this either of the barges may be brought into position over the hull, and cables 104 passed down through the wells 55. These cables are then passed under the hull of the sunken ship by the diver and their ends are secured to the inner sides of the dead lights 105 on the opposite side of the hull. In order to anchor the cables 104 in the dead lights I construct their ends as indicated in Figs. 12 and 13. In order to do this I provide the eye 106 of the cable with an earring or eye 107 of metal and this eye is provided with slots 108 at oppositely disposed points. These slots are engaged by a cross pin 109 which passes rigidly through a bar 110. This bar can turn on the pin 109 as a pivot so as to enable it to be fastened to the dead light or port hole and is then swung around into a position substantially at right angles to the cable; in this way it can seat against the inner side of the shell of the ship at the dead light and effectively anchors the cable.

By filling the water compartments in the barge as indicated in Fig. 5 it can be successively sunk and by pumping out the compartments raised so as to roll over the sunken hull. In doing this the diver should put blocks or shores under the bottom of the sunken ship so as to hold it and prevent its rolling back to its former position or if desired both barges can be used in this operation, one of the barges being utilized to hold the sunken ship against rolling back, while the other barge is being arranged to roll the sunken hull more completely. In this manner in some cases the cargo of the sunken ship can be discharged.

At the bow 111 of each barge and the stern 112 air compartments 113 are provided which are air tight and add to the buoyancy of the barges. These air compartments make it impossible to sink the barges even when all their water compartments are filled.

On the main deck 28 a track 114 is laid which extends continuously around the ship as shown in Fig. 9. On this track a truck may run which carrying machinery or tackle used in the raising of the ship.

The purpose of the drain chutes 73 is to facilitate the pumping out of a sunken ship when it is raised to a point between the two barges, the delivery pipes from the pump being introduced into the mouth 74 on the drain chutes for this purpose. This obviates the necessity of using lengths of hose running to the ends of the ship which might interfere with the operation of the cables.

Special attention is called to the carriers 62 and 70 and to their highly useful function in assisting the readjustment of the cables and slings in the raising operation.

Special attention is called to the fact that the upper portions of the wells 55 are of increased width so as to form enlarged chambers 55$^a$ and these facilitate the handling and operation of the chains or cables; and as indicated in Fig. 9 the openings 30 through the upper deck are enlarged laterally at one end for a similar purpose.

The truck is provided with a dredge pump 114$^a$ from which a suction sleeve or flexible hose 114$^b$ extends over the inboard side of the bridge and this suction hose is adapted to be run to the bottom near the sunken hull so as to dredge out the mud wherever desired. The delivery side of the dredge is provided with a hose 114$^c$ which may deliver the dredged material to one of the chutes 73 so as to carry across the barge and deliver it into a scow 114$^d$ which may be anchored alongside of the barge as indicated in Fig. 5. On account of the fact that this pump is mounted on a truck it should be evident that it can be brought into operation at any point along the length of the sunken ship. In addition to this use of the chutes 73 in dredging they may be used also for passing the cargo of the ship across the barge to a scow or raft. Instead of dumping dredged material into a scow alongside of the barge a conduit line can be rigged up on rafts if desired so as to carry the dredged material to a safe distance, that is a distance sufficient to prevent its return to the bottom near the sunken ship.

What I claim is:—

1. A barge of the class described having cable ways formed therein and disposed at intervals along the length of the barge, cable receiving trunks extending in an inclined direction from said cable ways and carriers extending between said cable ways, and trucks adapted to carry cables between the same.

2. A barge of the class described having wells through the bottom thereof forming cable ways and having trunks adjacent to said wells opening out on the side of the barge, and means in connection with said wells and said trunks for carrying cables therebetween.

3. A barge of the class described having vertical and inclined cable ways for guiding cables at different points, the buoyant bilge portion of the barge being continuous between said cable ways, and means for carrying the carrying cables back and forth between said vertical and inclined ways.

4. A barge of the class described having a plurality of cable ways, and endless cords passing through said cable ways and adapted to carry cables from one of said cable ways to the next.

5. A barge of the class described having a plurality of cable ways, and endless cords passing through said cable ways and adapted to carry cables from one of said cable ways to the next and said endless cords having means for securing cables thereto.

6. A barge of the class described having wells through the bottom thereof forming cable ways, inclined trunks adjacent to said wells and opening through the side of the barge, endless cords passing through said trunks and through said wells, said endless cords having means for securing cables thereto for carrying said cables from said wells into said trunks.

7. A barge of the class described having a longitudinal bulk head, water compartments formed in said barge on one side of said bulk head, a plurality of wells formed through the bottom of said barge on the other side of said bulk-heads, a plurality of trunks on said barge adjacent to said wells, said wells and said trunks constituting cable guides.

In witness that I claim the foregoing I have hereunto subscribed my name this 16th day of July 1910.

C. H. BROWN.

Witnesses:
F. D. AMMEN,
EDMUND A. STRAUSE.

---

Copies of this patent may be obtained for five cents each, by addressing the "Commissioner of Patents, Washington, D. C."